United States Patent Office 3,010,940
Patented Nov. 28, 1961

3,010,940
COATINGS OF THE POLYURETHANE TYPE
Francis R. Charlton, Pittsburgh, Floyd D. Trischler, Bridgeville, and Steve N. Buco, Blairsville, Pa., assignors to Koppers Company, Inc., a corporation of Delaware
No Drawing. Filed Jan. 13, 1958, Ser. No. 708,379
3 Claims. (Cl. 260—47)

This invention relates generally to coatings for metal, wood, glass, masonry, and concrete and more particularly relates to coatings of the polyurethane type.

While polyurethane coatings formed by the cross-linking of di or polyisocyanates with compounds containing two or more active hydrogens are well known, the use to which such coatings can be put have heretofore been limited. The coatings have generally had either good resistance to chemical attack and poor resistance to "physical" attack such as impact, abrasion, and flexibility or had poor resistance to chemical attack and good resistance to "physical" attack.

It has now been found that urethane coatings with unexpected and excellent properties with respect to both chemical and physical attacks can be formed by the cross-linking of polyisocyanates with polyhydroxyl polyalkaryl polyethers. The performance of the coatings of the various heretofore known urethanes as compared with the coatings of this invention are illustrated in the table below:

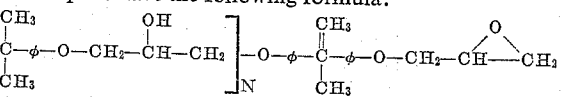

|  | Polyesters+ Polyisocyanates | Polyhydroxy Polyethers+ Polyisocyanates | Polyhydroxyl Polyalkaryl Polyether+ Polyisocyanates |
|---|---|---|---|
| Flex | Fair–Good | Excellent | Excellent. |
| Impact resistance | Poor–Fair | Fair–Good | Do. |
| 50% H₂SO₄ | Poor | Fair | Do. |
| 50% NaOH | do | do | Do. |
| Hardness | Hard | Soft-sl. soft | Very hard. |
| Oxygenated Solvents | Poor | Poor | Excellent. |
| Adhesion | Good | do | Do. |

The urethanes of this invention contemplate the product of the cross-linking of a polyisocyanate and a polyhydroxyl polyalkaryl polyether. The quantity of isocyanates used in the preparation of the product is near the equivalent necessary for cross-linking with the hydroxyl grouping of the polyhydroxyl polyalkaryl polyether and advantageously may be in the range of from 0.75 to 1.5 equivalents of isocyanate groups for each equivalent of hydroxyl group in the cross-linking agent.

Any of the organic polyisocyanate compounds commercially available such as toluene 2,4-diisocyanate, hexamethylene diisocyanate, naphthalene 1,5-diisocyanate may be used. Because of the great reactivity of such compounds, we prefer to use the product of a partial condensation of the diisocyanate with, for example, a polyol, glycol, or tri (hydroxy methyl) propane in a ratio of 1 mol of diisocyanate to each hydroxyl group of the polyol. The resulting condensation product is much less sensitive to atmospheric moisture. Such compounds react with the cross-linking agent more slowly to give a pot life of practical duration (pot life being the length of time after mixing during which the composition can be applied to a surface). Advantageously, the compound Mondur CB may be used. This compound has the general formula:

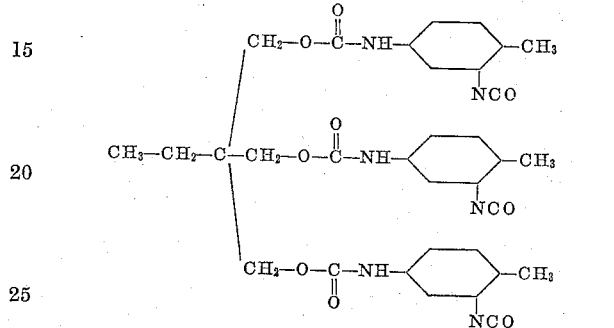

The polyhydroxyl polyalkaryl polyether is prepared by the reaction of a phenol with the diepoxide of a polyhydroxyl polyalkaryl polyether in the ratio of 0.8 to 1.2 equivalents of phenol to each equivalent of epoxide. The diepoxy polyhydroxyl polyalkaryl polyether may advantageously be the type sold under the trade name Epon. These Epons have the following formula:

$$O-\phi-\underset{\underset{CH_3}{|}}{\overset{\overset{CH_3}{|}}{C}}-\phi-O-CH_2-\underset{\underset{}{|}}{\overset{\overset{OH}{|}}{CH}}-CH_2\Big]_N-O-\phi-\underset{\underset{CH_3}{|}}{\overset{\overset{CH_3}{|}}{C}}-\phi-O-CH_2-CH\overset{O}{\diagdown}CH_2$$

where N may be from 0–25.

The phenol compound may be of the alkylated phenol type such as ortho or para cresol and nonyl phenol. The phenol may be advantageously a halogenated phenol such as dichloro phenol or parachloro ortho cresol to provide the coating with fire-resistance characteristics. The compound may be formed in a conventional manner as by the reactions discussed by Shechter and Wynstra in "Industrial and Engineering Chemistry," volume 48, No. 1, January 1956, pages 89–91, by heating the diepoxy polyhydroxy polyalkaryl polyether with phenol.

The reaction mass described above has the general formula:

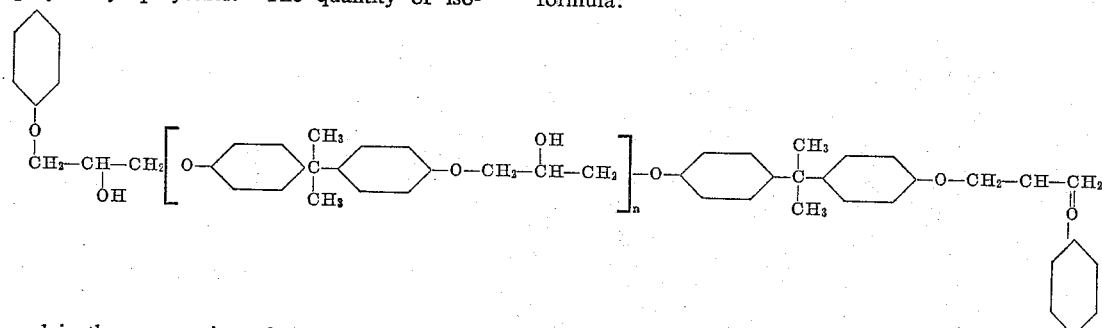

Advantageously, to this hot reaction mass is added a suitable solvent such as methyl isobutyl ketone, Cellosolve acetate, ethyl acetate, and cyclohexanone to lower the viscosity. If the solvent is not added at this time, the reaction mass sets to a glossy, solid mass and is difficult to remove from the reaction vessel or to handle. If desired, various pigments and fillers well known in the art may be added at this time to give it color or body. Such pigments and fillers include titanium dioxide, lithopone, iron oxide, carbon black, china clay, and barytes.

A polyepoxide such as the epoxidized novalak resins described in copending application, Serial No. 708,439 may be substituted for the diepoxides of the Epon type.

The reaction mass then has the general formula:

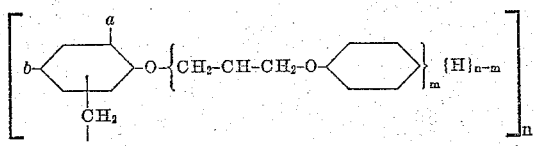

$a$ and $b$ may be any substituent group except carboxyl; $m$ is equal to or less than $n$ but not less than 2; $n$—2 or more.

The reaction of the epoxidized novalak and the phenol may be catalyzed with methyl benzyldimethylamine for instance.

The invention is illustrated but not limited by the following examples in which parts and percentages are by weight.

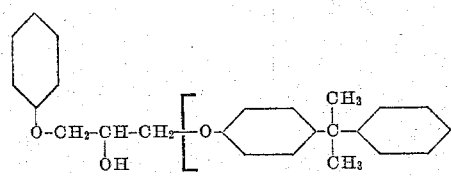

*Example I*

To a flask equipped with a reflux condenser, suitable heating means and agitator is added—300 grams a diepoxy polyhydroxyl polyalkaryl polyether known as Epon 828, 102 grams phenol, and 0.8 gram alpha methyl benzyldimethylamine and heated for four hours at 105°–115° C. The reaction mass is cut back with 200 grams of methyl isobutyl ketone. Then, 15.3 parts of the above solution is mixed at room temperature with 11.6 parts of Mondur CB whose general formula has been discussed above (the isocyanate to hydroxyl ratio being 1.5 to 1). The material has a pot life of about half an hour. The liquid is applied to a cleaned steel surface by a brush, spray, or roller, and dries to a tack-free film in about an hour. The film has excellent impact resistance, flexibility, and solvent resistance.

*Example II*

The above process is repeated using 500 grams a diepoxy polyhydroxyl polyalkaryl polyether known as Epon 1001 and 128 grams of para chloro phenol and heating the composition under total reflux to 140–180° C. for four hours. This reaction now is cut back with 250 grams of methyl isobutyl ketone, to this mixture is added 750 grams of Mondur CB whose general formula has been discussed above. This film has excellent adhesion qualities, impact resistance, flexibility and solvent resistance.

*Example III*

Using the apparatus of Example I, 176 grams of ortho cresol novalak epoxy, 93 grams phenol and .2% parts of alpha methyl benzyl dimethyl amine as a catalyst heated at 105–110° C. for one hour. The above reaction mass is cut back with 200 grams of methyl isobutyl ketone. The above cut back reaction product is mixed at room temperature with 300 grams of Mondur CB whose general formula has been discussed above. The resultant film after curing has excellent chemical and solvent resistance. This film is much harder than the film of Example II.

The foregoing has presented a novel composition usuable as a paint or coating. This coating cures to form a film having excellent adhesive properties and is resistant to a wide range of solvents and chemical environments. The film has excellent resistance to passage of electricity and to high temperatures. Whereas the cured films of epoxy resins are known to have poor resistance to water and aqueous environments especially at elevated temperatures compositions of the present invention show excellent resistance to such environment.

What is claimed is:

1. A polyurethane coating comprising the reaction product of (a) an organic polyisocyanate

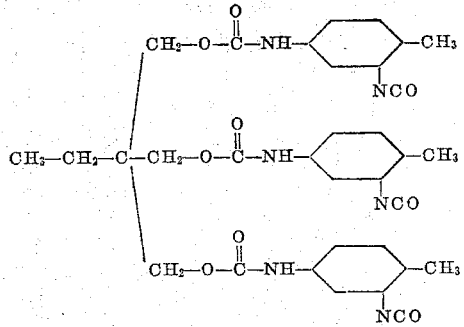

with (b) a polyol having the general formula

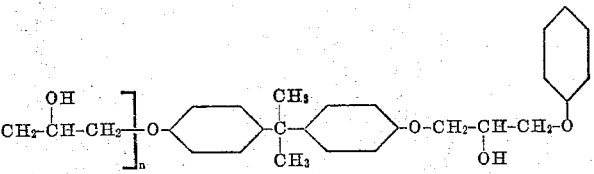

where $n$ is greater than 0.

2. The composition formed by mixing (a) an organic polyisocyanate having the general formula

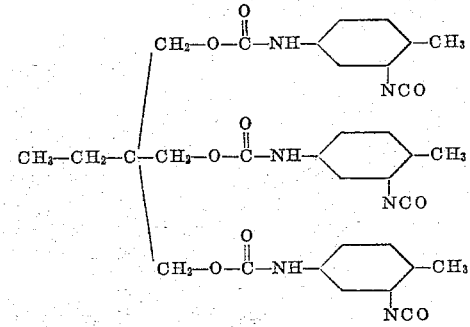

with (b) a polyol having the general formula

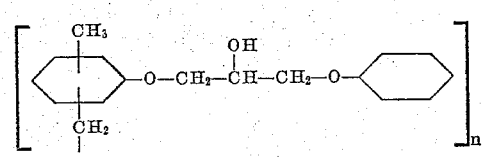

where $n$ is at least 2.

3. The composition formed by mixing (1) an organic polyisocyanate having the general formula

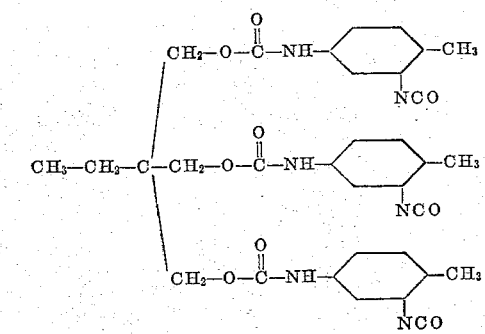

with (2) a polyol having the general formula
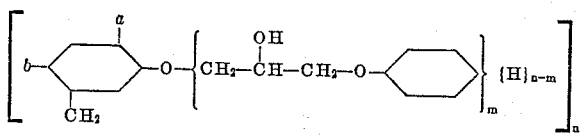
wherein $a$ and $b$ are substituent groups that do not contain carboxyl radicals, $n$ has a value of at least 2, and $m$ has a value of from 2 to the value of $n$.
References Cited in the file of this patent
UNITED STATES PATENTS
| | | |
|---|---|---|
| 2,615,007 | Greenlee | Oct. 21, 1952 |
| 2,615,008 | Greenlee | Oct. 21, 1952 |
| 2,788,335 | Barthel | Apr. 9, 1957 |
| 2,830,038 | Pattison | Apr. 8, 1958 |
| 2,833,740 | Verbane | May 6, 1958 |
| 2,959,571 | Faeber | Nov. 8, 1960 |
FOREIGN PATENTS
| | | |
|---|---|---|
| 522,895 | Canada | Mar. 20, 1956 |